Nov. 24, 1964    N. J. STEVENS    3,158,441
SEMI-CONTINUOUS MATERIAL TREATMENT PROCESS
Filed March 7, 1962    2 Sheets-Sheet 1
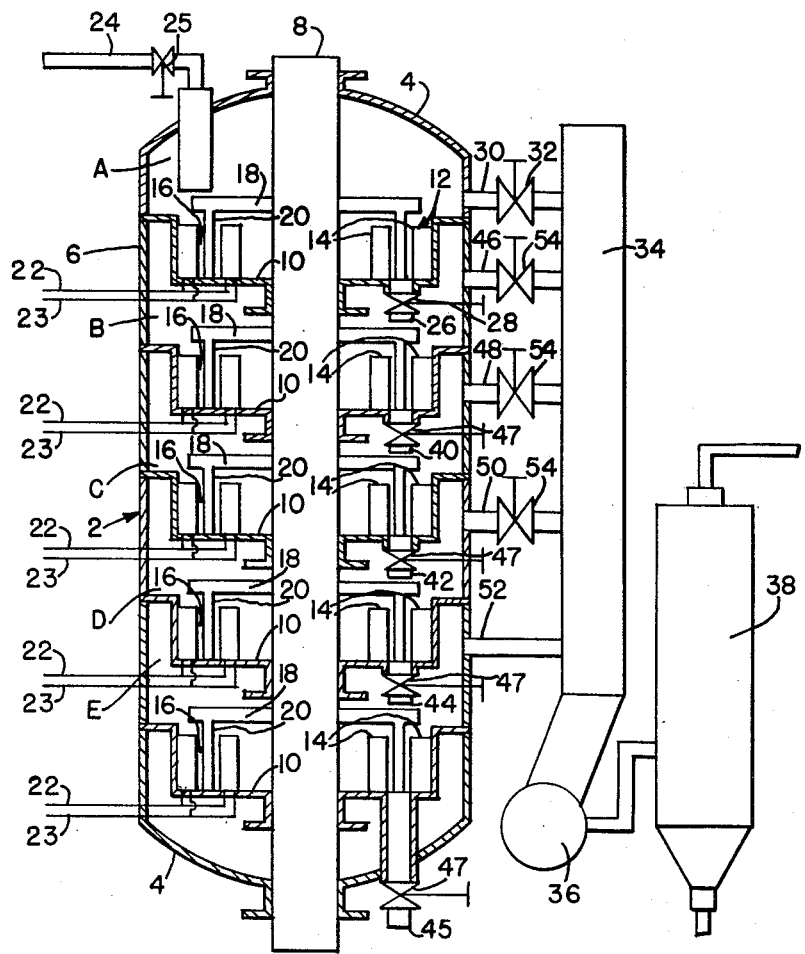
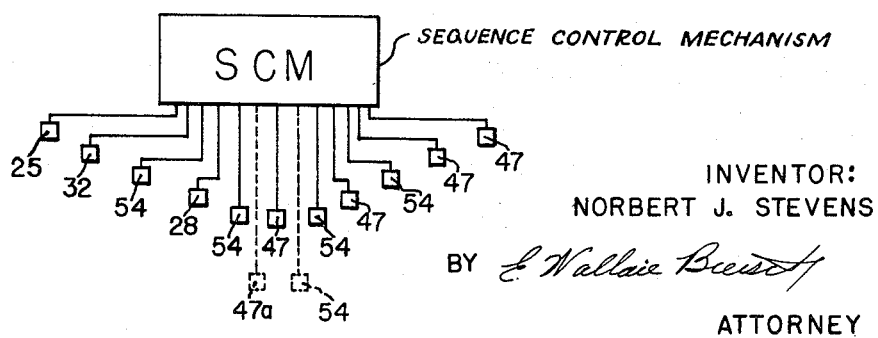
INVENTOR:
NORBERT J. STEVENS
BY *E. Wallace Breisch*
ATTORNEY Nov. 24, 1964   N. J. STEVENS   3,158,441
SEMI-CONTINUOUS MATERIAL TREATMENT PROCESS
Filed March 7, 1962   2 Sheets-Sheet 2

INVENTOR:
NORBERT J. STEVENS
BY
ATTORNEY

United States Patent Office 3,158,441
Patented Nov. 24, 1964

3,158,441
SEMI-CONTINUOUS MATERIAL TREATMENT PROCESS
Norbert J. Stevens, Alhambra, Calif., assignor to Joy Manufacturing Company, Pittsburgh, Pa., a corporation of Pennsylvania
Filed Mar. 7, 1962, Ser. No. 178,052
10 Claims. (Cl. 23—122)

This invention relates to a semi-continuous material treatment process and apparatus therefor and more particularly to apparatus and a process for the pressure calcination of gypsum.

Although the process and apparatus of this invention are applicable to the treatment of various materials the particular advantages thereof are best understood with reference to the pressure calcination of gypsum and accordingly the description herein is with reference to the pressure calcination of gypsum. Heretofore it has been common practice to obtain pressure calcination of gypsum by individual processing of batches of raw gypsum in individual pressurizing containers. With such a batch process it will readily be appreciated that each batch is individually prepared, treated and discharged so that each batch is only intermittently being calcinated. It is the purpose of this invention to provide a process and apparatus whereby gypsum is semi-continuously calcined and preferably calcined under pressure.

Accordingly, one object of this invention is to provide a new and improved process and apparatus for the semi-continuous treatment of material under pressure.

Another object of this invention is to provide a new and improved process and apparatus for the semi-continuous pressure calcination of gypsum.

Still another object of this invention is to provide for a new and improved process for the pressure calcination of gypsum comprising heating gypsum initially existing as a dihydrate in a plurality of sequential stages to form a hemihydrate.

A more specific object of this invention is to provide a new and improved process for the pressure calcination of gypsum comprising heating gypsum initially existing as a dihydrate in a plurality of sequential stages at pressures determined by the equilibrium vapor pressure of the mechanical and chemical moisture in the intermediate form of gypsum existing in the various sequential stages such that a hemihydrate gypsum is formed in the last of the sequential stages.

A still further object of this invention is to provide a new and improved apparatus for calcinating gypsum comprising a compartmentalized container, each compartment of which is provided with means for heating gypsum and which compartments discharge material seriatim to compartments adjacent thereto.

A more specific object of this invention is to provide a new and improved apparatus for calcinating gypsum comprising a compartmentalized container, each compartment of which is provided with means for heating gypsum and which compartments are provided with means for sequentially venting such compartments.

A still further object of this invention is to provide new and improved apparatus for calcinating gypsum comprising a compartmentalized container, each compartment of which is provided with means for heating gypsum and which compartments are provided with means for sequentially venting such compartments to a common collecting means.

These and other objects of this invention will become more apparent upon consideration of the following detailed description thereof and the drawings in which:

FIGURE 1 is a cross sectional veiw of apparatus constructed in accordance with the principles of this invention whereby the process of this invention can be followed;

FIGURE 2 is a diagrammatic view of the control system of this invention;

Figure 3:
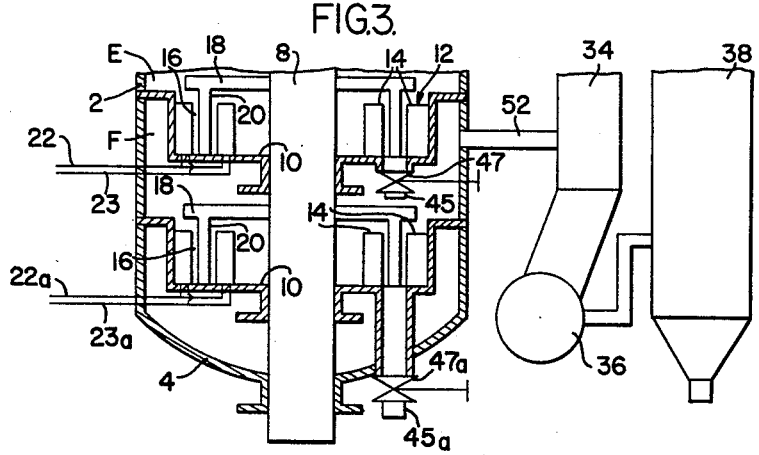
FIGURE 3 is a cross sectional view of a portion of other apparatus constructed in accordance with the principles of this invention whereby the process of this invention can be followed.

Referring to FIGURE 1 the apparatus of this invention comprises an elongated pressure vessel or housing 2 having suitable upper and lower head portions 4 connected by an elongated vertically extending tubular portion 6. A suitable elongated drive shaft 8 extends longitudinally through the housing 2 coaxial with the central axis thereof. As will become apparent sections of the housing 2 are pressurized and accordingly suitable sealing means are provided, not shown, on the drive shaft 8 where it passes through the heads 4. The shaft 8 is also constantly rotated by any suitable driving means, not shown, being drivingly connected thereto.

Housing 2 is divided into a plurality of longitudinally adjacent compartments A, B, C, D, and E by means of longitudinally spaced rigid baffles 10 located intermediate the heads 4 which are suitably sealed to the interior surface of the housing 2 and the outer surface of the shaft 8 so that the compartments can be pressurized as hereinafter described. Although the baffles 10 can be of any suitable form, as shown baffles 10 are cup shaped to suitably receive semi-continuous processors 12 therein, respectively. The processors 12 comprise hollow cylindrical heat exchangers 14 coaxially disposed about the shaft 8 and are spaced radially from each other to form an upwardly open channel 16 therebetween. Suitable arm suppports 18 are suitably rigidly secured to the shaft 8 in longitudinal spaced relationship and extend radially outwardly therefrom and rotate therewith outwardly adjacent the open ends of the channels 16, respectively. Supports 18 are provided with depending arms 20 which extend downwardly into the channels 16 respectively to sweep material therethrough during the heating of the gypsum. Although as shown each processor 12 comprises a pair of radially spaced heat exchangers 14 and only two arms 20 are shown on the supports 18, it is to be realized that the processors 12 do not, per se, constitute the invention herein but that such processor constitutes the novel structure more fully described, shown and claimed in my copending application Serial No. 110,294, filed May 3, 1961, entitled Processor for Solid Materials, which has been assigned to the same assignee as this invention. Accordingly, for a more particular description of a processor 12 the above identified copending application is herein referred to. A suitable heating medium is independently supplied to each of the heat exchangers 14 in any suitable manner such as hot oil circulating through suitable inlet and outlet connections 22 and 23, respectively, which are connected to the heat exchangers 14, respectively, and extend externally of the housing 2.

In order to provide for proper flow of gypsum through the compartment A, a suitable externally accessible gypsum feed line 24 extends through the upper head 4 with its lower end being located to discharge material into the processor 12 in compartment A. Inasmuch as compartment A is pressurized a suitable valve 25 is provided in line 24. A suitable discharge line 26 extends from the bottom of channel 16 in compartment A having a valve 28 therein to selectively discharge the material from the channel 16 of compartment A. Although the inlet 24 and the outlet 26 are shown as being diametrically spaced from each other the outlet 26 may be located in any portion of the bottom of the channel 16 as desired. In addition a suitable vent line 30 having a suitable control valve 32 therein is connected at one end to the compartment A and at the other end to an elongated vertically extended passageway 34 whereby the atmosphere in compartment A is selectively vented to passageway 34. The passageway 34 is formed in any suitable manner with the lower end thereof being connected to a suitable dry type collector 36, the discharge of which is connected to the inlet side of a suitable wet type collector 38. Collector 38 discharges to atmosphere and is provided with a suitable scrubbing medium, such as water, to prevent discharge of gypsum dust to the atmosphere.

Processors 12 of compartments B, C, D and E are provided with discharge lines 40, 42, 44 and 45, respectively, in the same manner as line 26 with the line 45 extending outwardly through the lower head 4. Lines 40, 42, 44 and 45 have suitable selectively operable valves 47 therein similar to valve 28 whereby the discharge from the channels 16 of compartments B, C, D and E are selectively controlled. It will be appreciated that the discharge lines 26, 40, 42 and 44 serve as the inlet lines for processors 12 in compartments B, C, D and E, respectively. Compartments B, C, D and E are also ventable to passageway 34 by means of vent lines 46, 48, 50 and 52 connected thereto, respectively, and connected to passageway 34. Lines 46, 48 and 50 are provided with suitable selectively operated valves 54 similar to valve 32 whereby compartments B, C, D and E are selectively vented to passageway 34. In a similar manner as processor 12 in compartment A the heat exchangers 14 of processors 12 in compartments B, C, D and E are connected to suitable inlet and exit lines 22 and 23, respectively, for a heat exchange medium such as hot oil.

Pure raw gypsum is commonly identified as calcium sulfate dihydrate and is repersented by the chemical formula $CaSO_4.2H_2OH_2O$ in which the $2H_2O$ represents water chemically bonded to the calcium sulfate and the $H_2O$ represents the water entrained in the calcium sulfate dihydrate or alternately expressed as water mechanically held on the surface of the calcium sulfate dihydrate. In the desired commercial form gypsum is known as stucco and is identified as calcium sulfate hemihydrate and is repersented by the formula $CaSO_4.\frac{1}{2}H_2O$. Thus it will be noted that in going from the dihydrate to the hemihydrate state the mechanically held water and 1½ moles of water per mole of calcium sulfate dihydrate is driven off to obtain the hemihydrate state.

In describing the operation of this invention it will be realized that the shaft 8 is being constantly rotated, heating medium is supplied to and exhausted from each of the heat exchangers 14 and that all the valves heretofore identified are initially closed. In practicing the process of this invention valve 25 in line 24 is opened and dihydrate gypsum illustratively at approximately 100° F. is suitably fed through line 24 into the processor 12 of compartment A. The arms 20 agitate and sweep the gypsum through the channel 16 in the processor 12 in compartment A as more fully described in the above identified copending application. During such circulation of the gypsum in compartment A the mechanically held water which is normally approximately 3% to 5% of the weight of the raw gypsum is heated to approximately 500° F. causing the mechanically held water to partially vaporize until equilibrium saturated conditions are reached at the imposed temperature. It will be appreciated that as valves 32, 28 and 25 are closed, compartment A will become pressurized by the water vapor driven off until vapor pressure is exceeded in the processor 12 in compartment A. It is the purpose of compartment A to drive off, preferably all, or at least susbtantially all, of the mechanically held water therein. It will be realized that the contact retention or dwell time for the dihydrate gypsum in compartment A is fixed so that the driving off of the free water in compartment A may vary slightly due to the variations in the dihydrate gypsum supplied thereto. Since dihydrate gypsum calcinates at 135° F. it may appear that some minor decomposition of the gypsum will occur in compartment A; however, decomposition of the gypsum does not occur in compartment A even though the gypsum is heated to 500° F. until all of the mechanically held water is driven off as, prior to such driving off of the mehcanically held water, the heat supplied to the gypsum in compartment A is used in converting the mechanically held water to vapor. However, as this stage is vented to vaporize the mechanical moisture, some calcination will occur. This calcination occuring will depend upon both the upper temperature of the material and the time allowed for venting. Once the desired temperature of 500° F. is reached in compartment A, valve 32 is opened and compartment A vented through line 30 to passageway 34 and the pressure in compartment A drops to atmospheric through the exhaust of collector 38 and the sensible heat of the material is converted to latent heat in the vaporizing process at atmospheric pressure. Thereafter valve 28 in line 26 opens and as arms 20 continue their rotation within compartment A, arms 20 sweep the dry gypsum into the line 26 through which it is discharged into the processor 12 in compartment B. After compartment A has been emptied of gypsum, valves 28 and 32 close and valve 25 is opened and additional raw gypsum is supplied to compartment A to be treated therein in the same manner as that previously described.

The dried gypsum is then circulated in processor 12 of compartment B for the same period of time as it was circulated in the processor 12 of compartment A. Oil is supplied to the heat exchangers 14 in compartment B to heat the gypsum therein to approximately 620° F. as sensible heat of the gypsum, and during the circulation in compartment B partial decomposition of the dried gypsum occurs. During such decomposition the chemically bonded water in the dried gypsum is driven off into the atmosphere of compartment B so that the compression in compartment B exceeds atmospheric pressure, a final pressure therein being reached which is dependent on the pressure of the gypsum therein, that is, until the equilibrium vapor pressure is reached. Although it is physically possible to completely dehydrate the gypsum in compartment B it is the purpose of this invention to provide a semi-continuous process with similar sized processors 12 and under such circumstances compartment B must be emptied immediately prior to the time that the gypsum in compartment A is dried and ready to be discharged. Complete dehydration or decomposition of gypsum requires a longer period of time than that required for drying, consequently complete dehydration or decomposition of the gypsum in compartment B does not occur.

Although not described heretofore, in order to more fully comprehend that the retention time in each processor 12 is equal the valves for compartments A, B, C, D and E are sequentially operated as follows. Assuming that gypsum exists in each of the compartments A, B, C, D and E; first valve 47 in line 45 is opened whereby the hemihydrate gypsum is discharged through line 45 to suitable receiving means as desired for the product. Valve 47 in line 45 is closed and valve 54 in line 50 is opened to vent chamber D to atmosphere through passageway 34 and after such venting has been completed or substantially completed, the valve 47 in line 44 is opened to permit the gypsum in compartment D to be discharged to compartment E. Valves 54 and 47 in lines 50 and 44, respectively, are closed and valve 54 in line 48 is opened to vent compartment C to atmosphere through the passageway 34. After such venting has been completed or substantially completed the valve 47 in line 42 is opened so that the gypsum in the compartment C is discharged through line 42 to the compartment D. After compartment C has been emptied, valves 47 and 54 in lines 42 and 48 are closed and valve 54 in line 46 is opened to vent compartment B to atmosphere through the passageway 34. Valve 47 in line 40 is opened after such venting has been completed or substantially completed and the gypsum in compartment B discharged through line 40 to the compartment C. After compartment B has been emptied of gypsum, valves 47 and 54 in lines 40 and 46 are closed and the valve 32 opened to vent compartment A to atmosphere through the passageway 34. After such venting has been completed or substantially completed the valve 28 is opened to discharge the dried gypsum in compartment A to compartment B. After compartment A has been emptied of gypsum valves 28 and 32 are closed and then valve 25 opened so that a new charge of gypsum is discharged into the compartment A through the inlet 24.

Thus although the above described valves do not operate simultaneously the sequence of the operation of the valves is such that the retention time of the gypsum in each compartment A, B, C, D and E is equal. Although shown only diagrammatically in the drawings it will be appreciated that the valves described may be of any suitable structure so as to be operable by suitable impulses such as electrical impulses which impulses will be suitably controlled to obtain the desired sequencing by means of a suitable sequence control mechanism SCM (see FIG. 2) for establishing electrical contact to a suitable actuating structure associated with the valves described, respectively, to obtain the operation described herein.

Although equal retention time in each of the compartments is desired, it is to be further realized that there is some latitude in such retention time and as long as the above described flow sequentially occurs, slight variations in the retention time of compartments A, B, C, D and E are not critical. The time to dry the gypsum in compartment A determines the retention time for the gypsum in each of the subsequent compartments. Thus, the gypsum is dried in compartment A, discharged to and partially decomposed in compartment B then discharged and further decomposed in compartment C. The heating medium for the exchangers 14 in compartment C is supplied to heat the gypsum therein to approximately 650° F. and during the retention time of the gypsum in compartment C the gypsum is further decomposed and some of the remaining chemically held water in the gypsum is driven off to pressurize compartment C, the pressure being determined by the temperature of the gypsum. Again, however, complete decomposition of the gypsum in compartment C does not occur due to the total length of time required for such decomposition and consequently the incompletely decomposed gypsum is discharged to the compartment D. The heat exchangers 14 in compartment D are heated to heat the gypsum in compartment D to approximately 680° F. and complete decomposition of the gypsum occurs therein with a pressure being established in compartment D as determined by the temperature of the gypsum. The completely decomposed gypsum after the retention time has elapsed is discharged to the compartment E the heat exchangers of which are heated to heat the gypsum to 340° F. so as to set the composition of the gypsum as it is discharged through the line 45. It will be appreciated that if it is desired to change the final composition of the discharged product from compartment E, it is not essential that the dwell time of the gypsum in compartment E be as long as that in compartments A, B, C and D. Consequently, if a shorter dwell time in compartment E is desired the valve 47 in line 45 may be opened prior to the completion of the dwell time of the other compartments to obtain discharge of the final product through line 45. It will be appreciated that such control can readily be obtained in a manner well known in the art. Compartment E does not have to be vented because total calcination of the gypsum occurs before the material enters compartment E.

It will be appreciated that inasmuch as calcination of gypsum is occurring in each of the compartments B, C and D and that considerable dust occurs in compartments A, B, C and D that a substantial volume of dusty exhaust air will flow through the lines 30, 46, 48 and 50 to the passageway 34 which dust particles are suitably collected in a suitable dry collector 36 and returned to the raw gypsum feed line 24. Consequently valve 32 in line 30 and valves 54 in lines 46, 48 and 50 are opened slowly to minimize the entrainment of gypsum from the processors 12 in the exhaust stream flowing through lines 30, 46, 48 and 50. Gypsum particles which are not collected in the dry collector 36 are discharged from the collector 36 to a suitable wet collector 38 to reduce the discharge of particulates to the atmosphere. By using a final wet collector, preferably with water as a scrubbing medium, the water vapor in the flow from the compartments A, B, C and D is condensed in the scrubbing water and discharged with the scrubbing water for the collector 38.

Figure 4:
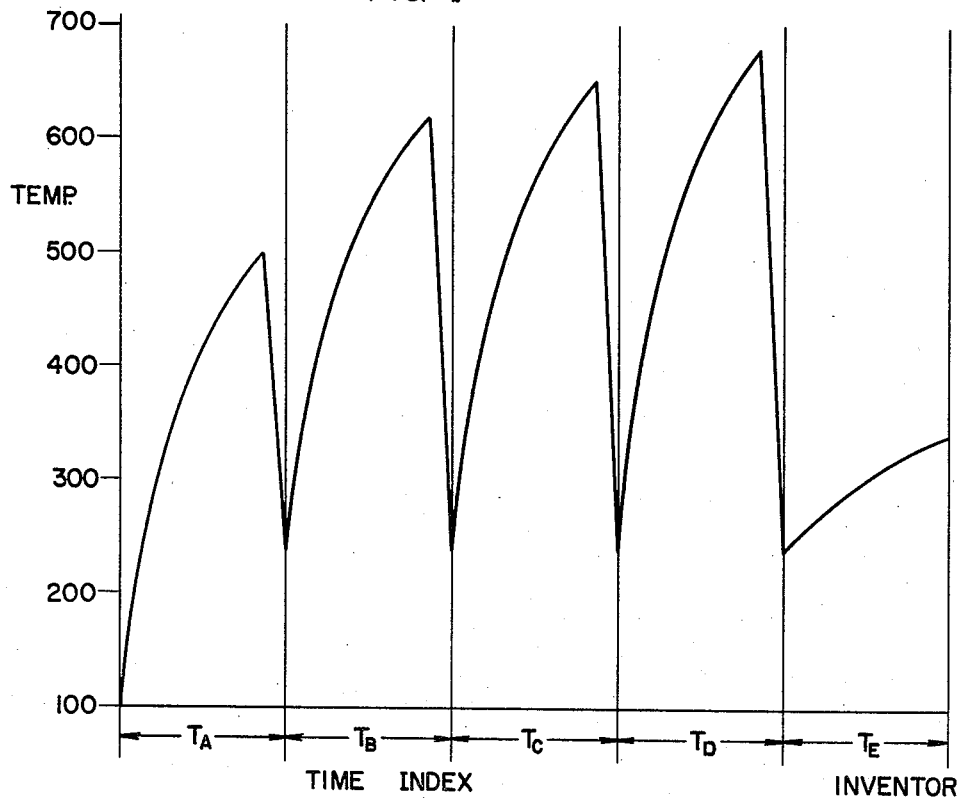
FIGURE 4 is a time temperature diagram of the process of this invention.

FIG. 4 illustrates the temperature-time plot of the gypsum as it is processed in the above described apparatus. Thus, as indicated with the time for drying the gypsum being determined by compartment A, with the time for complete calcination of gypsum being a physical property of the gypsum, the number of calcining compartments (that is compartments B, C and D) is determined by the quantity of gypsum which is desired to process through a complete cycle. Thus, for a given quantity of gypsum supplied to compartment A, a time $T_A$ is required to dry the gypsum and three calcining compartments B, C and D are required having an equal retention time $T_B$, $T_C$ and $T_D$, respectively. It is to be realized that it is preferred to have a housing 2 of constant diameter so that identical processors 12 can be employed in each compartment. It is, however, well within the scope of this invention to vary the size of the processors in the compartments subsequent to compartment A whereby the number of calcining compartments can be varied. Also, by providing more or less heat exchangers 14 in the processors 12 subsequent to the processor 12 in compartment A the rate of calcining in the compartments B, C and D can be varied. Thus, the size of the processors 12 subsequent to that in compartment A can be increased and the heat exchanger surface therein increased to reduce the number of calcining processors 12 required. The number of compartmetns may be increased to reduce the duty per compartment and the upper temperature which must be reached.

Although not shown, it will be realized that a single housing 2 for all of the processors 12 is not required. Thus, if desired, separate pressurizable compartments A′, B′, C′, D′ and E′ can be provided which function in the same manner as compartments A, B, C, D and E, respectively, with the discharge line of compartment A′ being connected to an inlet line to compartment B′ by any suitable gypsum conveying means. Similarly, the discharge lines of compartments B′, C′ and D′ are connected by suitable gypsum conveying means to suitable inlet lines for compartments C′, D′ and E′, respectively. Also, if desired, such intermediate stage conveyors can be of a structure to maintain the temperature of the gypsum during such transporting between stages as is well known.

FIG. 3 illustrates a modification of the structure heretofore described, which is identical to that previously described and in addition has a compartment F similar to the compartments A, B, C, D or E, provided within the housing 2 such that the gypsum in compartment E is discharged thereinto rather than being discharged externally of the housing 2. The compartment F discharges through a line 45a controllable by a valve 47a externally of the housing 2. The heat exchangers 14 of compartment F are provided with a suitable cooling medium through lines 22a and 23a whereby the gypsum processed therein is cooled to a temperature as desired such as 150° F. whereby the product gypsum can be directly bagged. Since the structure of compartment F with a processor 12 therein is identical to those previously described its sequential operation is believed to be obvious. That is, the compartment F must discharge before receiving a change from compartment E.

Thus, the structure and process of this invention provide for the semi-continuous calcination of gypsum in sequential stages in which the pressure is determined by the equilibrium vapor pressure of the water driven from the gypsum in each stage after the gypsum has achieved an equilibrium temperature, that is, when the temperature in the atmosphere of each compartment is equal to the internal temperature of the gypsum. It will be noted that raw gypsum is intermittently supplied to the apparatus and stucco gypsum is intermittently discharged from the apparatus; however, since some gypsum is continuously being treated a greater quantity of stucco gypsum can be obtained per unit of time compared with a batch process supplied with the same quantity of raw gypsum. By calcining gypsum under pressure, the particles are uniformly heated throughout, thereby providing better control of the calcination and a more uniform product. By releasing the pressure slowly, the product does not explode and the bulk density is increased thereby reducing shipping costs. If desired, any or all of the compartments A, B, C, D or E or A', B', C', D' or E' can be independently pressurized to any desired pressure above the equilibrium vapor pressure such as by supplying pressurized steam thereto.

Having described preferred embodiments of this invention in accordance with the patent statutes, it is to be realized that other modifications thereof may be made without departing from the broad spirit and scope of this invention. Accordingly it is respectfully requested that this invention be interpreted as broadly as possible and be limited only by the prior art.

I claim:

1. A method of calcining gypsum comprising the steps of: simultaneously heating a plurality of portions of gypsum consisting of a first portion at least one intermediate portion and a final portion at successively higher pressure stages increasing consecutively from said first portion to said final portion, sequentially venting said portions to atmospheric pressure beginning with said final portion and progressing inversely of said pressures to said first portion, discharging said final portion from said highest pressure stage, sequentially transporting the remaining ones of said portions to the next higher pressure stage respectively subsequent to said venting of the respective portion.

2. A method of calcining gypsum comprising the steps of: simultaneously heating a plurality of portions of gypsum consisting of a first portion at least one intermediate portion and a final portion at successively higher pressure stages increasing consecutively from said first portion to said final portion, sequentially venting said portions to substantially atmospheric pressure beginning with said final portion and progressing inversely of said pressures to said first portion, discharging said final portion from said highest pressure stage after said venting of said final portion, sequentially transporting the remaining ones of said portions to the next higher pressure stage respectively subsequent to said venting of the respective portion, introducing a further portion of gypsum into the pressure stage vacated by said first portion whereby said calcining of gypsum is a continuous process.

3. A method of calcining gypsum comprising the steps of: simultaneously heating a plurality of portions of gypsum consisting of a first portion at least one intermediate portion and a final portion at successively higher pressure stages increasing consecutively from said first portion to said final portion, sequentially venting said portions to atmospheric pressure beginning with said final portion after said gypsum in said final portion is fully calcined and progressing inversely of said pressures to said first portion, discharging said final portion from said highest pressure stage, sequentially transporting the remaining ones of said portions to the next higher pressure stage respectively subsequent to said venting of the respective portion.

4. A method of calcining gypsum comprising the steps of: simultaneously heating a plurality of portions of gypsum consisting of a first portion at least one intermediate portion and a final portion at successively higher pressure stages increasing consecutively from said first portion to said final portion, sequentially venting said portions to atmospheric pressure beginning with said final portion after said gypsum in said final portion is fully calcined and progressing inversely of said pressures to said first portion, discharging said final portion from said highest pressure stage, sequentially transporting the remaining ones of said portions to the next higher pressure stage respectively subsequent to said venting of the respective portion, introducing a further portion of gypsum into the pressure stage vacated by said first portion whereby said calcining of gypsum is a continuous process.

5. A method of calcining gypsum comprising the steps of: simultaneously heating a plurality of portions of gypsum consisting of a first portion at least one intermediate portion and a final portion at successively higher pressure stages increasing consecutively from said first portion to said final portion, sequentially venting said portions to atmospheric pressure beginning with said final portion after said gypsum in said final portion is fully calcined and progressing inversely of said pressures to said first portion, discharging said final portion from said highest pressure stage to a lower pressure cooling stage, sequentially transporting the remaining ones of said portions to the next higher pressure stage respectively subsequent to said venting of the respective portion, delivering fully calcined gypsum from said cooling stage as an end product of the process before said sequential transporting begins, introducing a further portion of gypsum into the pressure stage vacated by said first portion whereby said calcining of gypsum becomes a continuous process.

6. A method of calcining gypsum comprising the steps of: simultaneously heating a plurality of portions of gypsum consisting of a first portion a plurality of intermediate portions and a final portion at successively higher pressure stages increasing consecutively from said first portion to said final portion, sequentially venting said portions to atmospheric pressure beginning with said final portion and progressing inversely of said pressures to said first portion, discharging said final portion from said highest pressure stage, sequentially transporting the remaining ones of said portions to the next higher pressure stage respectively subsequent to said venting of the respective portions.

7. A method of calcining gypsum comprising the steps of: heating a first portion of gypsum to a temperature of 500° F. at a pressure equal to the vapor pressure of water at said temperature of 500° F. for a period of time necessary to remove substantially all of the mechanically held moisture in said first portion, simultaneously heating a second portion of gypsum to approximately 620° F. at a pressure equal to the vapor pressure of water at 620° F. for a period of time substantially equal to the heating period of said first portion, simultaneously heating a third portion of gypsum to approximately 650° F. at the vapor pressure of water at 650° F. for a period of time substantially equal to the said heating period of said first portion, simultaneously heating a fourth portion to approximately 680° F. at a pressure equal to the vapor pressure of water at 680° F. for a period of time substantially equal to the said heating period of said first portion, sequentially venting said portions to substantially atmospheric pressure beginning with said fourth portion and progressing to said third portion said second portion and said first portion in that order, removing said final portion from the calcining process and sequentially transporting the remainder of said portions to the next higher pressure stage respectively beginning with said third portion and progressing to said second portion and said first portion consecutively.

8. A method of calcining gypsum comprising the steps of: heating a first portion of gypsum to a temperature of 500° F. at a pressure equal to the vapor pressure of water at said temperature of 500° F. for a period of time necessary to remove substantially all of the mechanically held moisture in said first portion, simultaneously heating a second portion of gypsum to approximately 620° F. at a pressure equal to the vapor pressure of water at 620° F. for a period of time substantially equal to the heating period of said first portion, simultaneously heating a third portion of gypsum to approximately 650° F. at the vapor pressure of water at 650° F. for a period of time substantially equal to the said heating period of said first portion, simultaneously heating a fourth portion to approximately 680° F. at a pressure equal to the vapor pressure of water at 680° F. for a period of time substantially equal to the said heating period of said first portion, sequentially venting said portions to substantially atmospheric pressure beginning with said fourth portion and progressing to said third portion said second portion and said first portion in that order, removing said final portion from the calcining process and sequentially transporting the remainder of said portions to the next higher temperature stage respectively beginning with said third portion and progressing to said second portion and said first portion consecutively, said final portion being delivered to a relatively low temperature cooling stage, delivering fully clacined gypsum from said cooling stage as an end product of the process before said sequential transporting begins.

9. A method of calcining gypsum comprising the steps of: heating a first portion of gypsum to a temperatue of 500° F. at a pressure equal to the vapor pressure of water at said temperature of 500° F. for a period of time necessary to remove substantially all of the mechanically held moisture in said first portion, simultaneously heating a second portion of gypsum to approximately 620° F. at a pressure equal to the vapor presusre of water at 620° F. for a period of time substantially equal to the heating period of said first portion, simultaneously heating a third portion of gypsum to approximately 650° F. at the vapor pressure of water at 650° F. for a period of time substantially equal to the said heating period of said first portion, simultaneosuly heating a fourth portion to approximately 680° F. at a pressure equal to the vapor pressure of water at 680° F. for a period of time substantially equal to the said heating period of said first portion, sequentially venting said portions to substantially atmospheric pressure beginning with said fourth portion and progressing to said third portion said second portion and said first portion in that order, removing said final portion from the calcining process and sequentially transporting the remainder of said portions to the next higher temperature stage respectively beginning with said third portion and progressing to said second portion and said first portion consecutively, introducing a further portion of gypsum into the temperature stage vacated by said first portion whereby said calcining of gypsum becomes a continuous process.

10. A semi-continuous method of calcining gypsum comprising the steps of simultaneously heating a plurality of portions of gypsum in a plurality of successively interconnected compartments respectively with said plurality of portions being successive portions introduced into a first one of said plurality of compartments seriatim to be dried at a first pressure greater than atmospheric and with each said successive portion progressing through said plurality of interconnected compartments to be partially calcined under a second pressure greater than said first pressure in a second of said compartments, and being further calcined in succeeding compartments at successively greater pressures corresponding to the vapor pressure of intermediate forms of gypsum between a raw material dyhydrate and a finished product hemihydrate at successively higher temperatures, heating said portions for a fixed period of time, reducing the pressure imposed upon said plurality of portions successively beginning with the portion in the final one of said successive compartments, while simultaneously reducing the temperature of said portions in step with said pressure reduction, removing said portion from the said final one of said compartments, advancing one of said plurality of portions from the penultimate one of said plurality of compartments into said final one of said compartments, successively in reverse order advancing each of said plurality of portions from its respective compartment to the compartment next in series toward said last compartment until lastly advancing said portion in said first compartment into said second compartment, and refilling said first compartment with a portion of raw gypsum to follow said plurality of portions through said plurality of successive compartments.

References Cited in the file of this patent

UNITED STATES PATENTS

| | | |
|---|---|---|
| 519,259 | Higginson | May 1, 1894 |
| 1,446,863 | Townley et al. | Feb. 27, 1923 |
| 1,494,031 | Sohnlein | May 13, 1924 |
| 2,359,059 | Somes | Sept. 26, 1944 |